US008000744B2

(12) United States Patent  
Yoon et al.

(10) Patent No.: US 8,000,744 B2
(45) Date of Patent: Aug. 16, 2011

(54) APPARATUS AND METHOD FOR BEAMFORMING IN A COMMUNICATION SYSTEM

(75) Inventors: Eun-Chul Yoon, Yongin-si (KR); Min-Su Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 946 days.

(21) Appl. No.: 11/983,150

(22) Filed: Nov. 7, 2007

(65) Prior Publication Data
US 2008/0108390 A1 May 8, 2008

(30) Foreign Application Priority Data

Nov. 7, 2006 (KR) .................. 10-2006-0109418

(51) Int. Cl.
*H04B 1/38* (2006.01)

(52) U.S. Cl. .................. 455/561; 455/562.1; 455/67.16; 455/575.7; 455/121

(58) Field of Classification Search .......... 455/561, 455/65, 115.1, 517, 562.1, 63.4, 509, 512, 455/67.16; 370/208, 508, 342, 238, 252, 370/335, 329; 375/260, 267, 259, 295, 299, 375/343, 349; 343/893, 833, 834, 383, 367, 343/361, 377, 368

See application file for complete search history.

(56) References Cited

U.S. PATENT DOCUMENTS

| | | | |
|---|---|---|---|
| 6,480,153 B1 * | 11/2002 | Jung et al. | |
| 6,504,506 B1 * | 1/2003 | Thomas et al. | |
| 7,236,538 B1 * | 6/2007 | Banister | |
| 2002/0051433 A1 * | 5/2002 | Affes et al. | |
| 2002/0114269 A1 * | 8/2002 | Onggosanusi et al. | |
| 2003/0048223 A1 * | 3/2003 | Kezys | |
| 2004/0157646 A1 * | 8/2004 | Raleigh et al. | |
| 2005/0136841 A1 * | 6/2005 | Frank | |
| 2005/0254477 A1 * | 11/2005 | Lee et al. | |
| 2005/0259006 A1 * | 11/2005 | Kim et al. | |
| 2006/0121946 A1 * | 6/2006 | Walton et al. | 455/561 |
| 2006/0126753 A1 * | 6/2006 | Jwa et al. | |
| 2006/0148429 A1 * | 7/2006 | Inogai et al. | 455/115.1 |
| 2006/0232492 A1 * | 10/2006 | Sawatani | |
| 2008/0095251 A1 * | 4/2008 | Yeh et al. | 375/260 |
| 2008/0232258 A1 * | 9/2008 | Larsson et al. | |

FOREIGN PATENT DOCUMENTS

| | | | |
|---|---|---|---|
| KR | 1020050050829 A | | 6/2005 |
| KR | 1020050109789 A | | 11/2005 |
| KR | 1020050111845 A | | 11/2005 |
| KR | 1020060071321 A | | 6/2006 |

OTHER PUBLICATIONS

Office Action dated Jan. 18, 2010 in connection with Korean Patent Application No. 10-2006-0109418.

* cited by examiner

*Primary Examiner* — Tan Trinh (57) ABSTRACT

An apparatus and method for beamforming in a communication system are provided, in which a base station receives a channel vector from each of a plurality of mobile stations, generates an uplink channel matrix using the received channel vectors, generates a beamforming weight vector using the uplink channel matrix and a fixed constant that minimizes a channel error rate, and forms beams using the beamforming weight vector.

15 Claims, 7 Drawing Sheets

APPARATUS AND METHOD FOR BEAMFORMING IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 7, 2006 and assigned Serial No. 2006-109418, the entire disclosure of which is incorporated herein by reference.

TECHNICAL FIELD OF THE INVENTION

The present invention generally relates to a communication system. More particularly, the present invention relates to an apparatus and method for beamforming in a communication system.

BACKGROUND OF THE INVENTION

Future-generation communication systems called $4^{th}$ Generation (4G) are under active study to provide high-speed services with a variety of Quality of Service (QoS) requirements to users. Especially, research is being actively conducted on support of high-speed services by ensuring mobility and QoS to Broadband Wireless Access (BWA) communication systems such as Wireless Local Area Network (WLAN) and Wireless Metropolitan Area Network (WMAN).

In such a system, a transmitter (e.g., a base station or BS) can transmit to a receiver (e.g., a mobile station or MS) a signal weighted based on channel quality information by transmitter maximal ratio combining (Tx-MRC). While Tx-MRC is efficient in signal transmission between two points, namely point-to-point communications under a single-cell environment, it degrades overall system performance due to the influence of interference introduced from neighbor cells under a multi-cell environment.

To avert the problem, the communication system adopts beamforming to cancel interference. Beamforming is a signal transmission scheme using a beamforming weight vector. The BS transmits a signal an MS using a beamforming weight vector with which it receives a signal from the MS.

This signal transmission and reception scheme is based on the premise that downlink and uplink channels between the BS and the MS are symmetrical. The above beamforming scheme for interference cancellation is implemented using a smart antenna based on information, such as Degree Of Angle (DOA), on a deterministic channel model that models perfect spatial separation between a desired signal and a non-desired signal by beams.

As stated above, the beamforming scheme is realized on the deterministic channel model. In a Time Division Duplexing (TDD) communication system, for example, an uplink beamforming weight vector (i.e., an uplink beam pattern) is still valid for the downlink only if a desired signal and an interference signal are received and transmitted at different angles under a stable channel environment. However, the desired signal and the interference signal are not separated perfectly in space under a complex channel environment such as a scattering environment. In this case, a statistical channel model should substitute for the deterministic channel model.

For this purpose, the BS should represent the channels from an array antenna to a single antenna of the MS as a vector. The vector (i.e., channel vector), which usually has Gaussian characteristics, is not given as a function of one DOA. Under the scattering environment, the downlink differs from the uplink in link characteristics because the downlink and the uplink reflect noise statuses. Therefore, application of the uplink beamforming weight vector to the downlink degrades performance.

The beamforming scheme is based on the assumption that the BS calculates a beamforming weight vector using accurate channel information. The BS acquires the channel information by feedback resulting from downlink channel estimation of the MS. However, inaccurate channel estimation of the MS, a feedback delay of the MS, and a processing delay of the BS can cause channel estimation errors.

Sounding is another method for acquiring channel information in which the BS uses channel estimation information acquired from the uplink for the downlink. Similarly, the sounding-based channel estimation may have errors due to inaccurate channel estimation and different channel characteristics between the downlink and the uplink.

Accordingly, there exists a need for performing beamforming, taking into account channel estimation errors caused by different channel characteristics between the downlink and the uplink in a communication system.

SUMMARY OF THE INVENTION

The present invention addresses at least the problems and/or disadvantages and provides at least the advantages described below. Accordingly, an aspect of exemplary embodiments of the present invention is to provide an apparatus and method for beamforming to reduce the effects of an interference signal in a communication system.

Another aspect of exemplary embodiments of the present invention provides an apparatus and method for beamforming, which are applicable to a channel environment in which the downlink and the uplink have different channel characteristics.

In accordance with an aspect of exemplary embodiments of the present invention, a beamforming apparatus in a communication system is provided. The apparatus includes a Base Station that receives at least one channel vector from each of a plurality of Mobile Stations, generates an uplink channel matrix using the at least one of channel vectors, generates a beamforming weight vector using the uplink channel matrix and a fixed constant that minimizes a channel error rate, and forms beams using the beamforming weight vector.

In accordance with another aspect of exemplary embodiments of the present invention, a beamforming method of a Base Station in a communication system is provided. At least one channel vector is received from each of the Mobile Stations, an uplink channel matrix is generated using the at least one of channel vectors, a beamforming weight vector is generated using the uplink channel matrix and a fixed constant that minimizes a channel error rate, and beams are formed using the beamforming weight vector.

In accordance with another aspect of exemplary embodiments of the present invention, a beamforming system in a communication system is provided, the beamforming system includes at least one of Mobile Stations, and BS receives at least one of channel vectors from each of MSs, generates an uplink channel matrix using the at least one of channel vectors, generates a beamforming weight vector using the uplink channel matrix and a fixed constant that minimizes a channel error rate, and forms beams using the beamforming weight vector.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF PREFERRED EMBODIMENTS

Preferred embodiments of the present invention are described in detail with reference to the accompanying drawings. Detailed descriptions of constructions or processes known in the art may be omitted to avoid obscuring the subject matter of the present invention.

Exemplary embodiments of the present invention provide an apparatus and method for beamforming so as to cancel interference in a communication system. In accordance with the present invention, a Base Station (BS) receives a channel vector from each of the Mobile Station (MS)s, generates an uplink channel matrix using the channel vectors, generates a beamforming weight vector using the uplink channel matrix and a fixed constant that minimizes a channel error rate, and forms beams using the beamforming weight vector.

Figure 1:
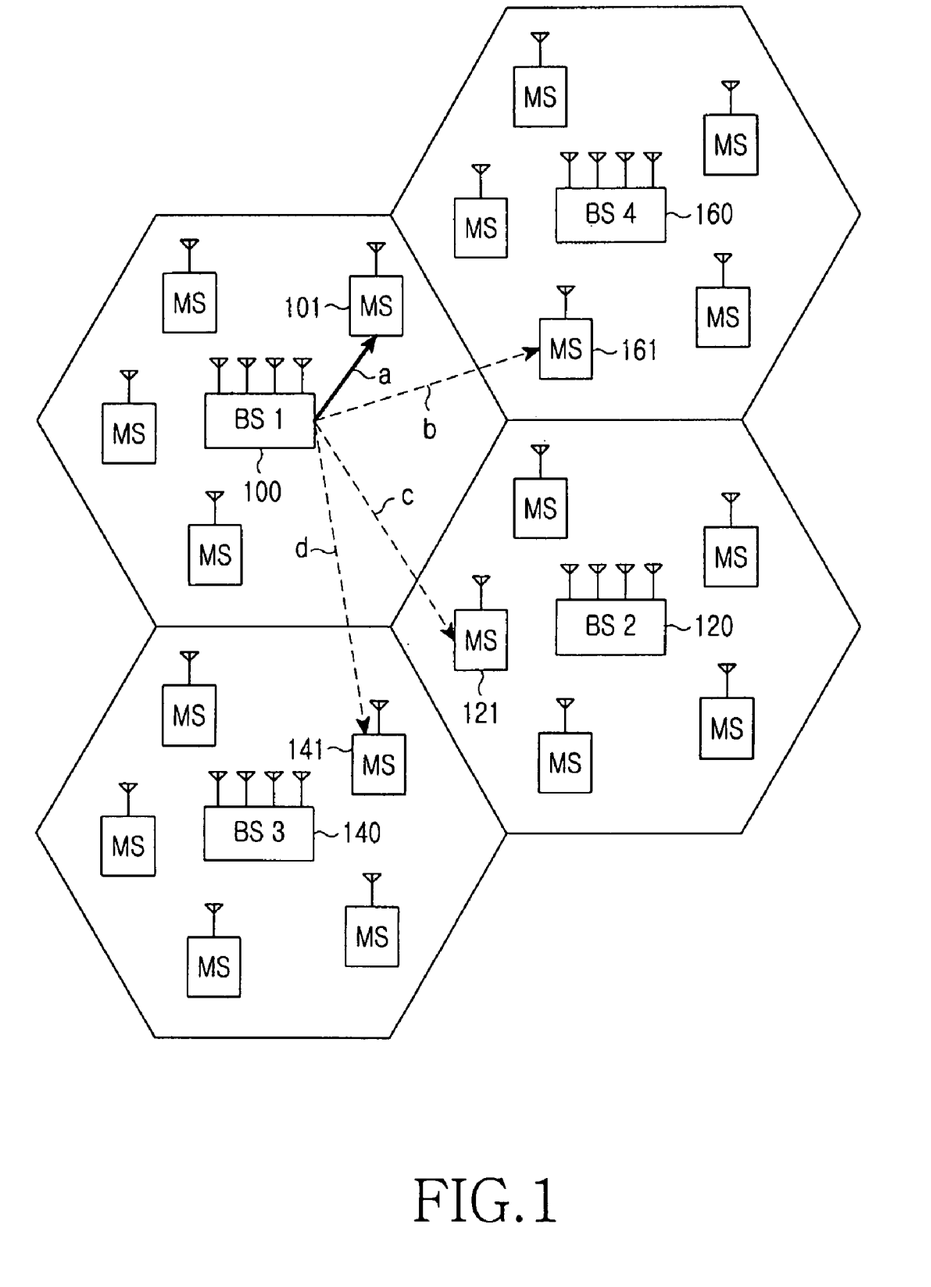
FIG. 1 illustrates the configuration of a communication system according to an exemplary embodiment of the present invention.

FIG. 1 illustrates the configuration of a communication system according to an exemplary embodiment of the present invention.

Referring to FIG. 1, the communication system is multi-cellular. In the communication system, first to fourth BSs 100, 120, 140 and 160 (BS1 to BS4) have their own coverage areas, that is, cells including first to fourth MSs 101, 121, 141 and 161, respectively. It is assumed herein each BS has a plurality of transmit antennas, for example, four transmit antennas and each MS has a single antenna. In the illustrated case of FIG. 1, each cell uses the same frequency band, for example, the same Orthogonal Frequency Division Multiplexing (OFDM) subchannel and a plurality of MSs within the same cell use different subcarriers in a frequency band allocated to the cell.

Figure 2:
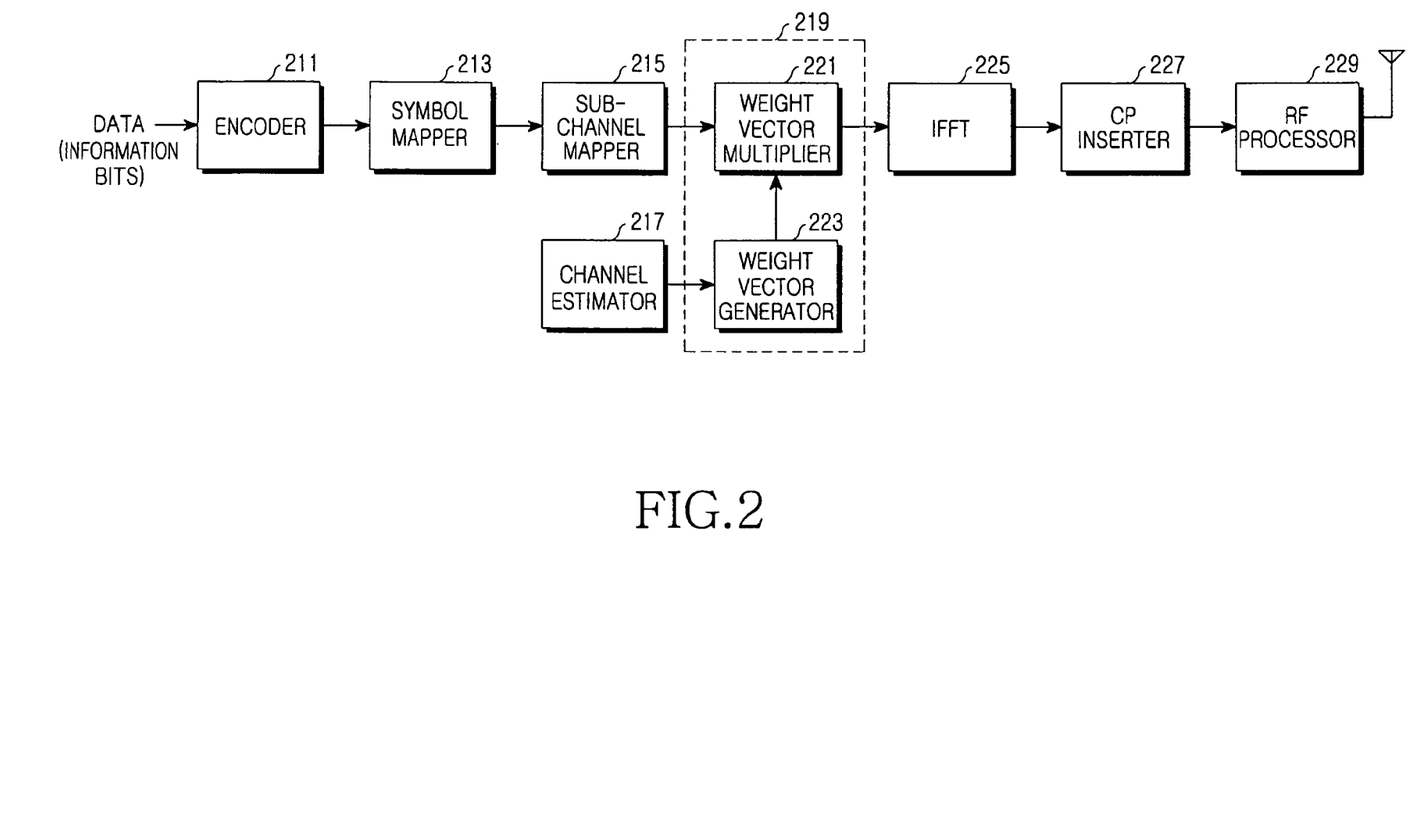
FIG. 2 is a block diagram of a transmitter in the communication system according to an exemplary embodiment of the present invention.

BS1 transmits a signal indicated by a solid arrowed line "a" to the MS 101 within its service area. Although the transmitted signal does not affect other MSs within the cell of BS1, it interferes with the MSs 121, 141 and 161 in neighbor cells, as indicated by dotted arrowed lines "b", "c" and "d". To mitigate the interference (i.e., co-channel interference), signals to be transmitted through the antennas of BS1 are multiplied by a beamforming weight vector in the present invention. The resulting transmission signals are delivered to the MS 101 with maximal reception power, minimizing interference with the MSs 121, 141 and 161 in the neighbor cells. With reference to FIG. 2, the structure of a transmitter according to an exemplary embodiment of the present invention will be described below.

FIG. 2 is a block diagram of a transmitter in the communication system according to an exemplary embodiment of the present invention.

Referring to FIG. 2, the transmitter includes an encoder 211, a symbol mapper 213, a subchannel mapper 215, a channel estimator 217, a beamformer 219, an inverse Fast Fourier Transform (IFFT) processor 225, a cyclic prefix (CP) inserter 227, and a radio frequency (RF) processor 229.

Upon generation of user data, i.e. information bits to be transmitted, the encoder 211 encodes the information bits in a predetermined coding scheme.

The symbol mapper 213 modulates the coded bits in a predetermined modulation scheme, such as binary phase shift keying (BPSK), quadrature phase shift keying (QPSK), 16-ary quadrature amplitude modulation (16 QAM), or 64-ary QAM (64 QAM).

The subchannel mapper 215 maps the modulation symbols to frequency tones (i.e., a subchannel) in such a manner that MSs within the cell use different time and frequency resources, to thereby cancel intra-cell interference.

The channel estimator 217 estimates channels of the transmitter and provides channel estimation information to the beamformer 219.

The beamformer 219 generates a beamforming weight vector based on the channel estimation information and multiplies the subchannel-mapped signal by the beamforming vector according to the present invention. The beamforming operation will be described later in great detail.

The IFFT processor 225 IFFT-processes the signal received from the beamformer 219. The CP inserter 227 inserts a CP into the IFFT signal.

The RF processor 229, which has a filter and a front-end unit, upconverts the CP-including signal to an RF signal transmittable in the air and transmits the RF signal through transmit (Tx) antennas over the air.

The beamformer 219 includes a weight vector generator 223 for generating the beamforming weight vector based on the channel estimation and a weight vector multiplier 221 for multiplying the transmission signals by the beamforming weight vector. The weight vector generator 223 takes into account whether the channel estimation information has errors or not in generating a beamforming weight vector. Generation of a beamforming weight vector for both cases of erroneous channel estimation information and normal channel estimation information will be described later in detail.

Figure 3:
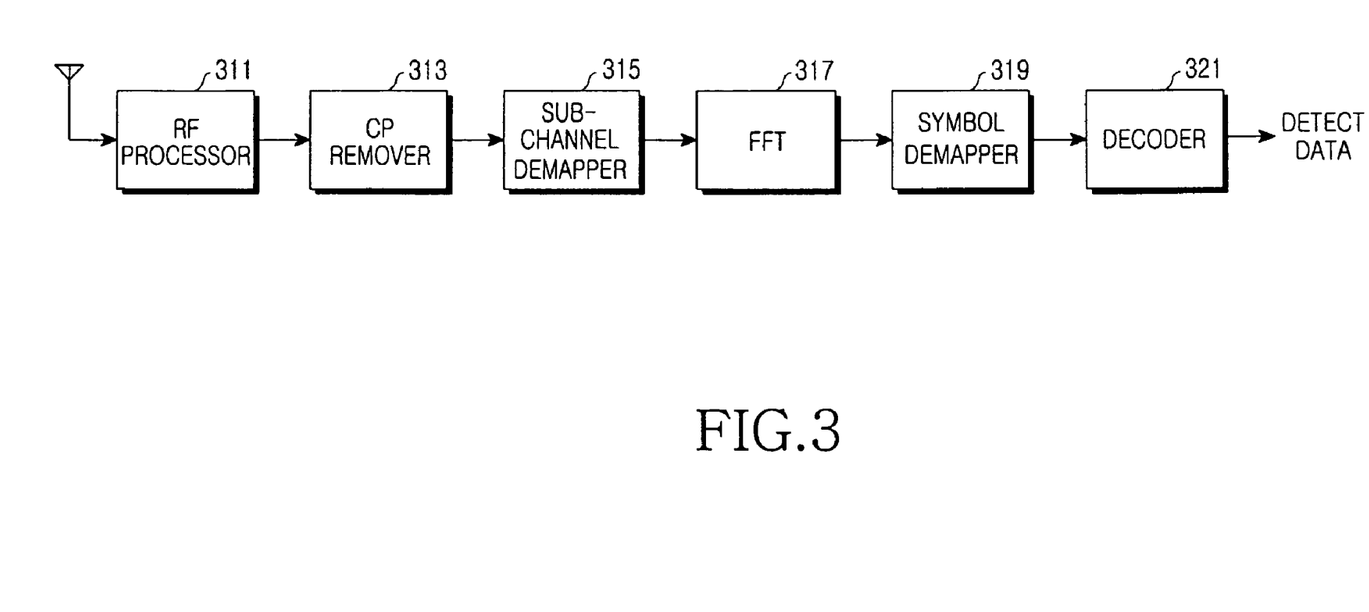
FIG. 3 is a block diagram of a receiver in the communication system according to an exemplary embodiment of the present invention.

With reference to FIG. 3, the structure of a receiver according to an exemplary embodiment of the present invention will be described.

FIG. 3 is a block diagram of a receiver in the communication system according to an exemplary embodiment of the present invention.

Referring to FIG. 3, the receiver includes an RF processor 311, a CP remover 313, a subchannel demapper 315, a Fast Fourier Transform (FFT) processor 317, a symbol demapper 319, and a decoder 321.

The RF processor 311 downconverts an RF signal received from the transmitter through a Receive (Rx) antenna.

The CP remover 313 removes a CP from the downconverted signal.

The subchannel demapper 315 demaps the CP-free signal from a subchannel in accordance with the subchannel mapping of the subchannel mapper 215.

The FFT processor 317 FFT-processes the demapped signal.

The symbol demapper 319 demodulates the FFT signal in a predetermined demodulation scheme.

The decoder 321 decodes the demodulated signal in a predetermined decoding scheme, thereby detecting data transmitted by the transmitter.

The demodulation scheme and the decoding scheme correspond to the modulation scheme and the coding scheme used in the transmitter.

Before a detailed description of beamforming according to the present invention, it is assumed that there are $M_T$ cells, each BS has $M_T$ transmit (Tx) antennas, and each MS that receives a signal from a BS has a single receive (Rx) antenna, by way of example.

It is also assumed that one MS in a cell uses the same frequency band as one MS in each neighbor cell. In other words, there exist $M_T$ BSs and $M_T$ MSs. When cells are indexed from 1 to $M_T$, the BSs covering the cells and the MSs in the cells are also indexed from 1 to $M_T$.

For the $M_T$ Tx antennas of an $i^{th}$ BS and the single Rx antenna of an MS, channels on which the $i^{th}$ BS transmits a signal to the MS can be represented as $M_T$ complex numbers. A channel vector $\vec{h}_{i \to j}$ can be represented as a row vector in which the $M_T$ complex numbers are arranged horizontally.

If more BSs (i.e., cells) than Tx antennas exist, BSs fewer than the Tx antennas are selected.

A particular BS performs channel estimation by receiving sounding signals from MSs within neighbor cells, for example. MSs are selected in an order of interference that the BS gives to the MSs and then the neighbor BSs including the selected MSs are selected.

If fewer BSs (i.e., cells) than Tx antennas exist, there is no need for selecting BSs because interference in MSs included in all neighbor BSs of the particular BS can be cancelled.

A weight applied to each Tx antenna of the $i^{th}$ BS can be expressed as a complex number with an amplitude and a phase. Typically, weights that offer optimal performance are different for different antennas. A weight vector $W_i$ can be represented as a column vector in which the $M_T$ complex numbers are arranged vertically. The weight vector $W_i$ is assumed to be normalized. That is, the norm of each of the $M_T$ complex numbers of the weight vector $W_i$ is 1.

Figure 4:
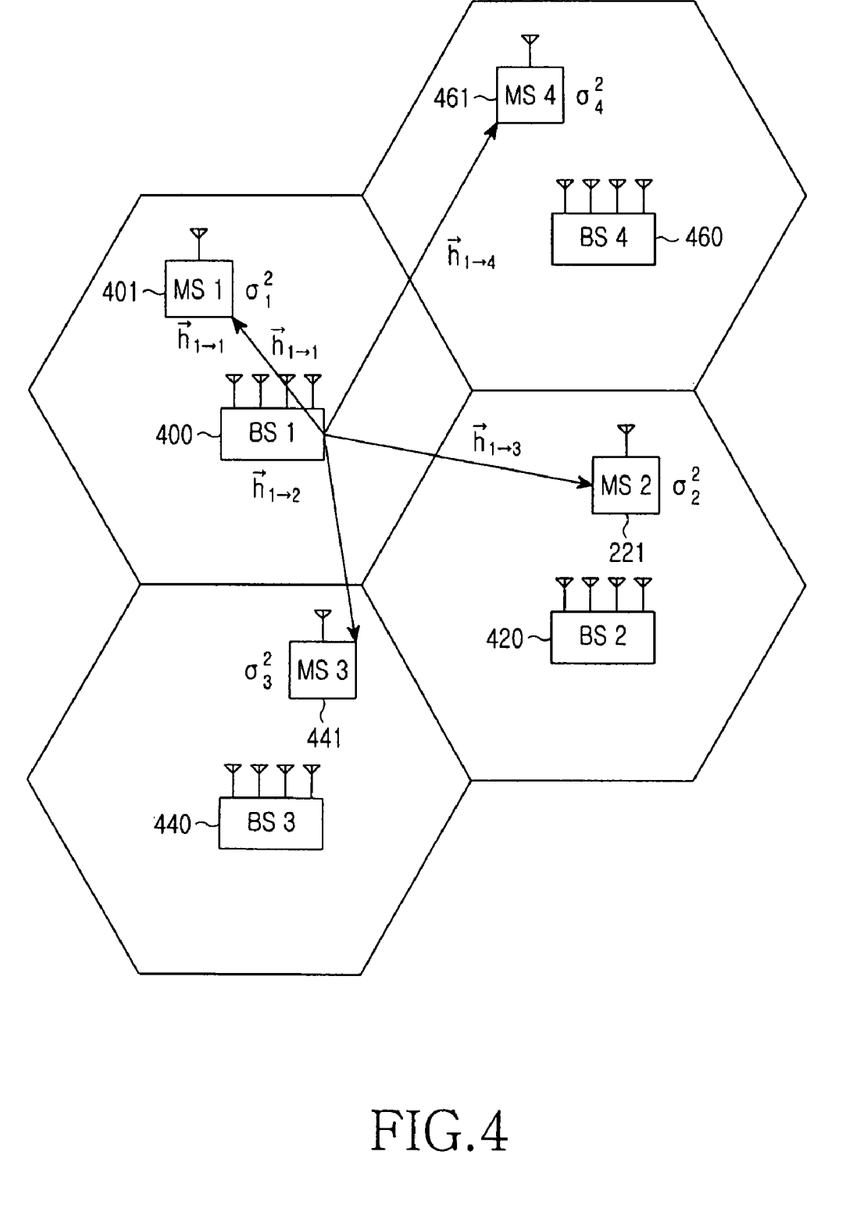
FIG. 4 illustrates the configuration of a communication system based on beamforming parameters according to an exemplary embodiment of the present invention.

It is assumed that the BSs of all cells have the same transmit power P. The noise variance of an $i^{th}$ MS is denoted by $\sigma_i^2$. With reference to FIG. 4, the configuration of a communication system will be described along with the parameters used for beamforming (referred to as beamforming parameters).

FIG. 4 illustrates the configuration of a communication system based on beamforming parameters according to an exemplary embodiment of the present invention.

Referring to FIG. 4, the communication system is multi-cellular with $M_T=4$. That is, the communication system has four cells. BSs 400, 420, 440 and 460 (BS1 to BS4) have their own cells in which MSs 401, 411, 421, 441 and 461 (MS1 to MS4) communicate with BS1 to BS4.

MS1 to MS4 have noise variances of $\sigma_1^2, \sigma_2^2, \sigma_3^2$ and $\sigma_4^2$, respectively. As stated before, the noise variance of each MS is represented as $\sigma_i^2$ where i is the index of the MS. The channel vectors between BS1 and MS1 to MS4 are $\vec{h}_{1 \to 1}$, $\vec{h}_{1 \to 2}$, $\vec{h}_{1 \to 3}$, and $\vec{h}_{1 \to 4}$ respectively. For convenience, only the channel vectors $\vec{h}_{i \to j}$ when i=1 are shown.

Channel estimation may involve errors. To prevent the channel estimation errors, a beamforming weight vector is generated using a fixed constant in the present invention. Calculation of the fixed constant in a transmitter, for example, in a BS will be described with reference to FIG. 5.

Figure 5:
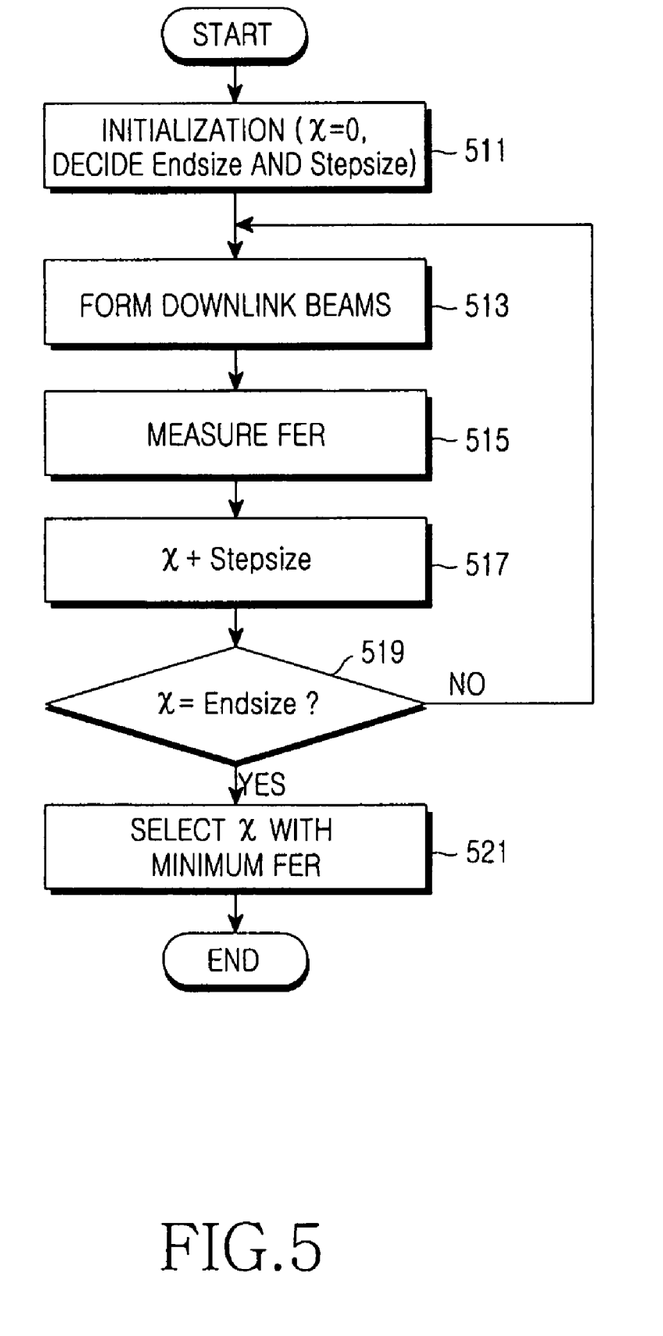
FIG. 5 is a flowchart of an operation for selecting a fixed constant in the communication system according to an exemplary embodiment of the present invention.

FIG. 5 is a flowchart of an operation for selecting a fixed constant in the communication system according to an exemplary embodiment of the present invention.

Referring to FIG. 5, the BS performs an initialization for calculation of a fixed constant according to the present invention in step 511. The BS sets the fixed constant $\chi$ to 0 and sets a stepwise increment, Stepsize for achieving an optimal fixed constant and a maximum size, Endsize for limiting the range of the fixed constant. Stepwise and Endsize may vary depending on system situations and characteristics.

In step 513, the BS forms downlink beams. The BS measures a Frame Error Rate (FER) involved in the beamforming in step 515 and increases the fixed constant $\chi$ by Stepsize in step 517.

In step 519, the BS compares the fixed constant $\chi$ with Endsize. If the fixed constant $\chi$ is different from Endsize, the BS returns to step 513.

If the fixed constant X is equal to Endsize, the BS selects a fixed constant that minimizes the FER from among the fixed constants in step 521.

The fixed constant is used for generating a beamforming weight vector. The fixed constant minimizes an error rate. Also, the fixed constant reflects a channel variation. The weight vector generator of the BS can select the fixed constant, for example. To calculate the fixed constant, a channel and a Modulation and Coding Scheme (MCS) level are selected and the FER is measured, while fixing the transmit power. In this manner, the fixed constant can be acquired with respect to the specific channel and MCS level. The fixed constant can be obtained by a simulation or actually measured.

Generation of a beamforming weight vector according to the present invention will be described with reference to FIG. 6.

Figure 6:
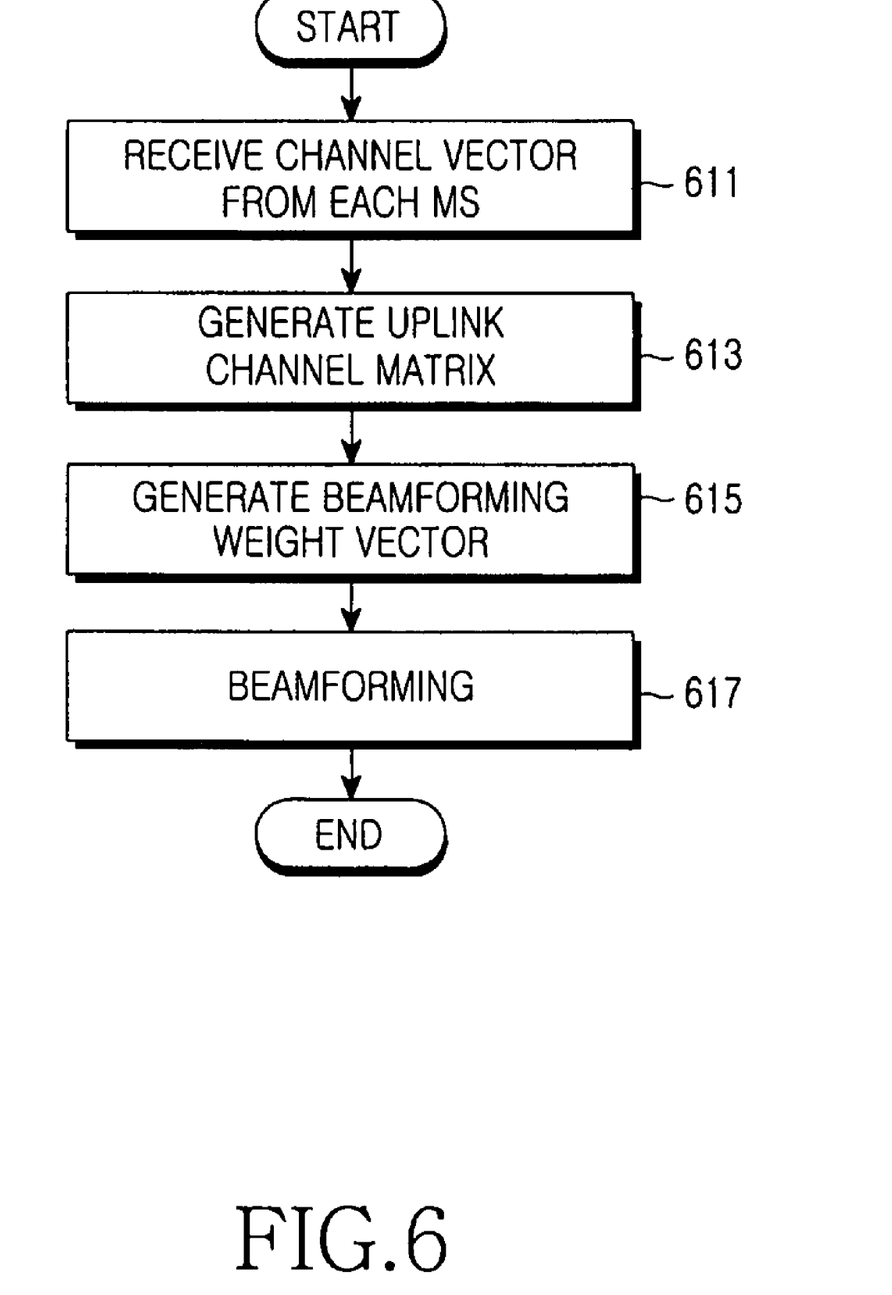
FIG. 6 is a flowchart of an operation for calculating a beamforming weight vector in the communication system according to an exemplary embodiment of the present invention.

FIG. 6 is a flowchart of an operation for calculating a beamforming weight vector in the communication system according to an exemplary embodiment of the present invention.

Referring to FIG. 6, the BS acquires channel information (e.g., a channel vector) from each MS by feedback or sounding in step 601. Let the index of the BS be denoted by u. Then the BS acquires channel information from MSs, $\vec{h}_{u \to i}$ (for i=1, 2, . . . , $M_T$).

The BS generates an uplink channel matrix using the channel vectors in step 613. The row vectors $\vec{h}_{u \to i}$ (for i= 1, 2, . . . , $M_T$) are sequentially stacked vertically, thus producing an $M_T \times M_T$ matrix, $H_u$. The matrix $H_u$ is expressed as:

$$H_u = [\vec{h}_{u \to 1}^T \vec{h}_{u \to 2}^T \ldots \vec{h}_{u \to M_T}^T]^T. \quad \text{[Eqn. 1]}$$

In Equation 1, u denotes the index of the BS, $M_T$ denotes the index of an MS in a different cell, and T represents a transpose matrix.

In step 615, the BS generates an $M_T \times 1$ beamforming weight vector using the fixed constant X acquired in the procedure of FIG. 5 by:

$$w_u = \frac{1}{\alpha}(H_u^H H_u + \chi I)^{-1} \vec{h}_{u \to u}^H. \quad \text{[Eqn. 2]}$$

In Equation 2, $\alpha$ denotes a normalization constant that makes the norm of the beamforming weight vector be 1, I denotes a unitary matrix, and $\vec{h}_{u \to u}^H$ denotes the channel vector of a $u^{th}$ MS within the cell of the $u^{th}$ BS. $H_u^H H_u + \chi I$ denotes a correlation matrix compensated by the fixed constant. The use of the fixed constant prevents an FER increase caused by an increased Signal-to-Noise Ratio (SNR) in the present invention.

In step 617, the BS forms beams by applying the beamforming weight vector to transmission signals. Steps 611 to 615 for generating the beamforming weight vector can be performed in the weight vector generator and the application of the beamforming weight vector can be carried out in the weight vector multiplier of the BS.

Figure 7:
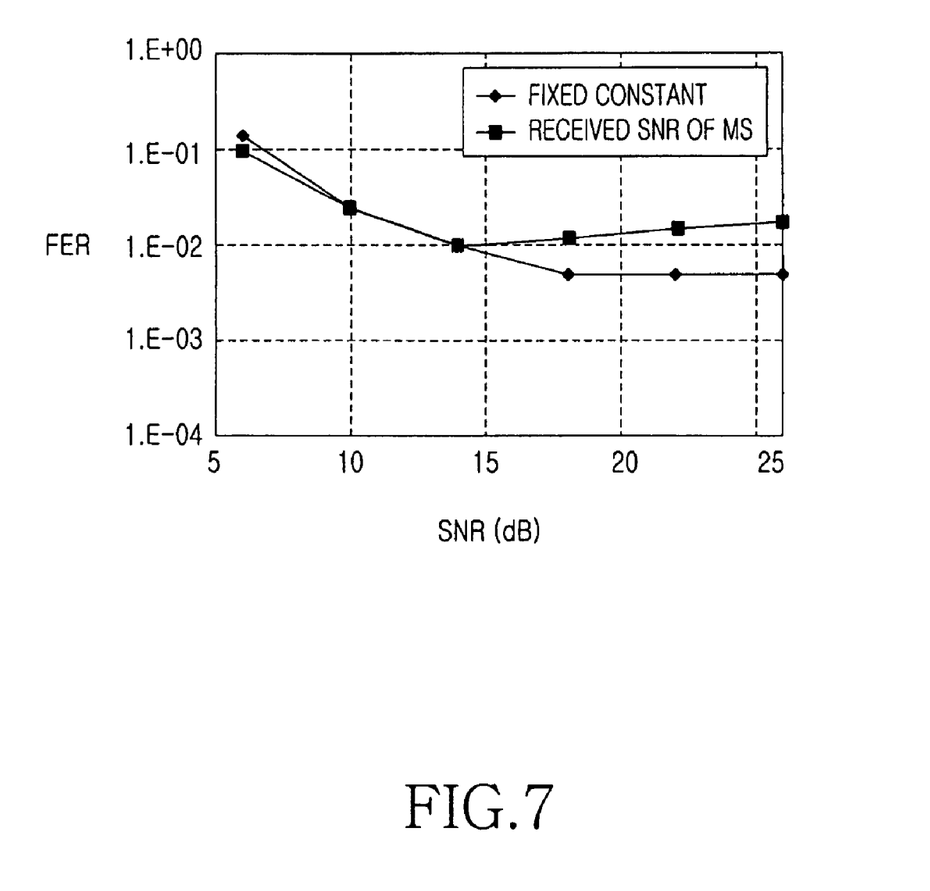
FIG. 7 is a beamforming performance graph according to an exemplary embodiment of the present invention.

FIG. 7 is a beamforming performance graph according to an exemplary embodiment of the present invention.

Referring to FIG. 7, the graph illustrates FERs in the case where beamforming is performed using a fixed constant-based beamforming weight vector, and FERs in the case where beamforming is performed using a beamforming weight vector based on the received SNRs of MSs. As noted from the graph, the former case outperforms the latter case.

As is apparent from the above description, the present invention advantageously reduces the effects of interference through fixed constant-based beamforming. The present invention also enables beamforming less sensitive to a channel estimation error or a process delay and is applicable under an environment in which the downlink and the uplink have different channel characteristics, by use of the fixed constant instead of a channel estimation value. Therefore, overall system performance can be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A beamforming apparatus in a communication system, comprising:
a base station configured to receive at least one channel vector from each of a plurality of mobile stations, generate an uplink channel matrix using the at least one channel vector, generate a beamforming weight vector using the uplink channel matrix and a fixed constant, and form beams using the beamforming weight vector,
wherein the base station comprises:
a channel estimator configured to receive the at least one channel vector from the each mobile station;
a weight vector generator configured to generate the uplink channel matrix using the at least one channel vector and generate the beamforming weight vector using the fixed constant; and
a weight vector multiplier configured to perform beamforming by applying the beamforming weight vector to a transmission signal.

2. The beamforming apparatus of claim 1, wherein each channel vector received from the each mobile station is acquired by the each mobile station from a signal transmitted by the base station.

3. The beamforming apparatus of claim 1, wherein the uplink channel matrix is expressed as $$H_u = [\vec{h}_{u \to 1}^T \vec{h}_{u \to 2}^T \ldots \vec{h}_{u \to M_T}^T]^T$$

where u denotes the index of the base station, $M_T$ denotes the index of a mobile station in a different cell, $\vec{h}_{u \to i}$ (for i= 1, 2, ..., $M_T$) denotes the channel vector, and T represents a transpose matrix.

4. The beamforming apparatus of claim 3, wherein the beamforming weight vector is expressed as $$w_u = \frac{1}{\alpha}(H_u^H H_u + \chi I)^{-1} \vec{h}_{u \to u}^H$$

where $\alpha$ denotes a normalization constant that makes the norm of the beamforming weight vector be 1, $\chi$ denotes the fixed constant, I denotes a unitary matrix, $H_u^H H_u + \chi I$ denotes a correlation matrix compensated by the fixed constant, and $\vec{h}_{u \to u}^H$ denotes the channel vector of a $u^{th}$ mobile station within a cell of the $u^{th}$ base station.

5. A beamforming method for use in a base station in a communication system, the method comprising:
receiving at least one channel vector from each of a plurality of mobile stations; stations at a channel estimator of the base station;
generating an uplink channel matrix using the at least one channel vector at a weight vector generator of the base station;
generating a beamforming weight vector using the uplink channel matrix and a fixed constant at the weight vector generator of the base station; and
forming beams at a weight vector multiplier of the base station by applying the beamforming weight vector to a transmission signal.

6. The beamforming method of claim 5, wherein the uplink channel matrix generation includes generating the uplink channel matrix as follows:

$$H_u = [\vec{h}_{u \to 1}^T \vec{h}_{u \to 2}^T \ldots \vec{h}_{u \to M_T}^T]^T$$

where u denotes the index of the base station, $M_T$ denotes the index of a mobile station in a different cell, $\vec{h}_{u \to i}$ (for i= 1, 2, ..., $M_T$) denotes the channel vector, and T represents a transpose matrix.

7. The beamforming method of claim 6, wherein the beamforming weight vector generation comprises generating the beamforming weight vector as follows:

$$w_u = \frac{1}{\alpha}(H_u^H H_u + \chi I)^{-1} \vec{h}_{u \to u}^H$$

where $\alpha$ denotes a normalization constant that makes the norm of the beamforming weight vector be 1, $\chi$ denotes the fixed constant, I denotes a unitary matrix, $H_u^H H_u + \chi I$ denotes a correlation matrix compensated by the fixed constant, and $\vec{h}_{u \to u}^H$ denotes the channel vector of a $u^{th}$ mobile station within a cell of the $u^{th}$ base station.

8. A wireless communication system comprising a plurality of base stations for communicating with mobile stations accessing the wireless communication system, wherein each of the plurality of base stations receives a channel vector from each of a plurality of mobile stations, generates an uplink channel matrix using the received channel vectors, generates a beamforming weight vector using the uplink channel matrix and a fixed constant, and forms beams using the beamforming weight vector,
wherein the base station comprises:
a channel estimator configured to receive the at least one channel vector from the each mobile station;
a weight vector generator configured to generate the uplink channel matrix using the at least one channel vector, and generate the beamforming weight vector using the fixed constant; and a weight vector multiplier configured to perform beamforming by applying the beamforming weight vector to a transmission signal.

9. The wireless communication system of claim 8, wherein each channel vector received from the each mobile station is acquired by the each mobile station from a signal transmitted by the each base station.

10. The wireless communication system of claim 8, wherein the uplink channel matrix is expressed as $$H_u = [\vec{h}_{u \to 1}{}^T \vec{h}_{u \to 2}{}^T \ldots \vec{h}_{u \to M_T}{}^T]^T$$

where u denotes the index of the each base station, $M_T$ denotes the index of a mobile station in a different cell, $\vec{h}_{u \to i}$ (for i=1, 2, ..., $M_T$) denotes the channel vector, and T represents a transpose matrix.

11. The wireless communication system of claim 10, wherein the beamforming weight vector is expressed as $$w_u = \frac{1}{\alpha}(H_u^H H_u + \chi I)^{-1} \vec{h}_{u \to u}^H,$$

where $\alpha$ denotes a normalization constant that makes the norm of the beamforming weight vector be 1, $\chi$ denotes the fixed constant, I denotes a unitary matrix, $H_u^H H_u + \chi I$ denotes a correlation matrix compensated by the fixed constant, and $\vec{h}_{u \to u}^H$ denotes the channel vector of a $u^{th}$ mobile station within a cell of the $u^{th}$ base station.

12. A beamforming system in a communication system, comprising
 a least one mobile station; and
 a base station configured to receive at least one channel vector from each of the at least one mobile station, generate an uplink channel matrix using the at least one channel vector, generate a beamforming weight vector using the uplink channel matrix and a fixed constant, and form beams using the beamforming weight vector, wherein the base station comprises:
 a channel estimator configured to receive the at least one channel vector from the each mobile station;
 a weight vector generator configured to generate the uplink channel matrix using the at least one channel vector and generate the beamforming weight vector using the fixed constant; and
 a weight vector multiplier configured to perform beamforming by applying the beamforming weight vector to a transmission signal.

13. The beamforming system of claim 12, wherein the mobile station acquires a channel vector from a signal received from the base station and transmits the channel vector to the base station.

14. The beamforming system of claim 12, wherein the uplink channel matrix is expressed as $$H_u = [\vec{h}_{u \to 1}{}^T \vec{h}_{u \to 2}{}^T \ldots \vec{h}_{u \to M_T}{}^T]^T,$$

where u denotes the index of the each base station, $M_T$ denotes the index of a mobile station in a different cell, $\vec{h}_{u \to i}$ (for i=1, 2, ..., $M_T$) denotes the channel vector, and T represents a transpose matrix.

15. The beamforming apparatus of claim 14, wherein the beamforming weight vector is expressed as $$w_u = \frac{1}{\alpha}(H_u^H H_u + \chi I)^{-1} \vec{h}_{u \to u}^H,$$

where $\alpha$ denotes a normalization constant that makes the norm of the beamforming weight vector be 1, $\chi$ denotes the fixed constant, I denotes a unitary matrix, $H_u^H H_u + \chi I$ denotes a correlation matrix compensated by the fixed constant, and $\vec{h}_{u \to u}^H$ denotes the channel vector of a $u^{th}$ mobile station within a cell of the $u^{th}$ base station.

* * * * *